(12) United States Patent
Kunz

(10) Patent No.: US 8,595,973 B1
(45) Date of Patent: Dec. 3, 2013

(54) FISHING POLE MOUNT

(76) Inventor: Arthur S. Kunz, Chubbuck, ID (US)

( * ) Notice: Subject to any disclaimer, the term of this patent is extended or adjusted under 35 U.S.C. 154(b) by 287 days.

(21) Appl. No.: 13/105,742

(22) Filed: May 11, 2011

(51) Int. Cl.
*A01K 97/10* (2006.01)

(52) U.S. Cl.
USPC ............. 43/21.2; 248/514; 248/535; 248/538

(58) Field of Classification Search
USPC .................. 43/21.2; 248/511, 514, 534–536, 248/538–541
IPC ....................................................... A01K 97/10
See application file for complete search history.

(56) References Cited

U.S. PATENT DOCUMENTS

| | | | |
|---|---|---|---|
| 2,055,842 A | 9/1936 | Haislip | |
| 2,452,279 A * | 10/1948 | Young | 43/21.2 |
| 3,077,327 A | 2/1963 | Batie et al. | |
| 3,802,112 A * | 4/1974 | Banner | 43/21.2 |
| 3,903,633 A * | 9/1975 | Hutcherson | 43/17 |
| 4,819,903 A | 4/1989 | Jimenez | |
| 4,835,896 A | 6/1989 | Bowen | |
| 5,987,804 A * | 11/1999 | Shearer et al. | 43/21.2 |
| 7,753,441 B1 | 7/2010 | Gray, Jr. | |
| 7,774,973 B2 * | 8/2010 | Carnevali | 43/21.2 |

* cited by examiner

*Primary Examiner* — Darren W Ark
*Assistant Examiner* — Timothy Schwarz

(57) ABSTRACT

A fishing pole mount that includes a support tube that has an adjustable support brace attached to it. The fishing pole mount also has an upper clamp that is not adjustable. The support tube of the fishing pole mount can be fixedly attached to a camp chair or other fixed object while a handle of a fishing pole can be inserted into the support tube. The fishing pole mount can be used either for storage of a fishing pole or a resting point while the fishing rod is in use.

3 Claims, 4 Drawing Sheets

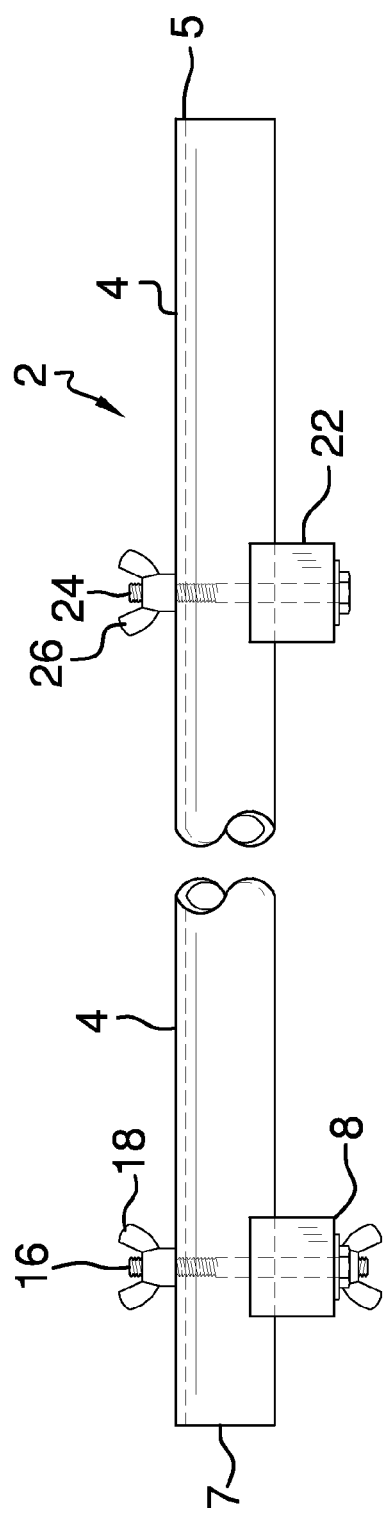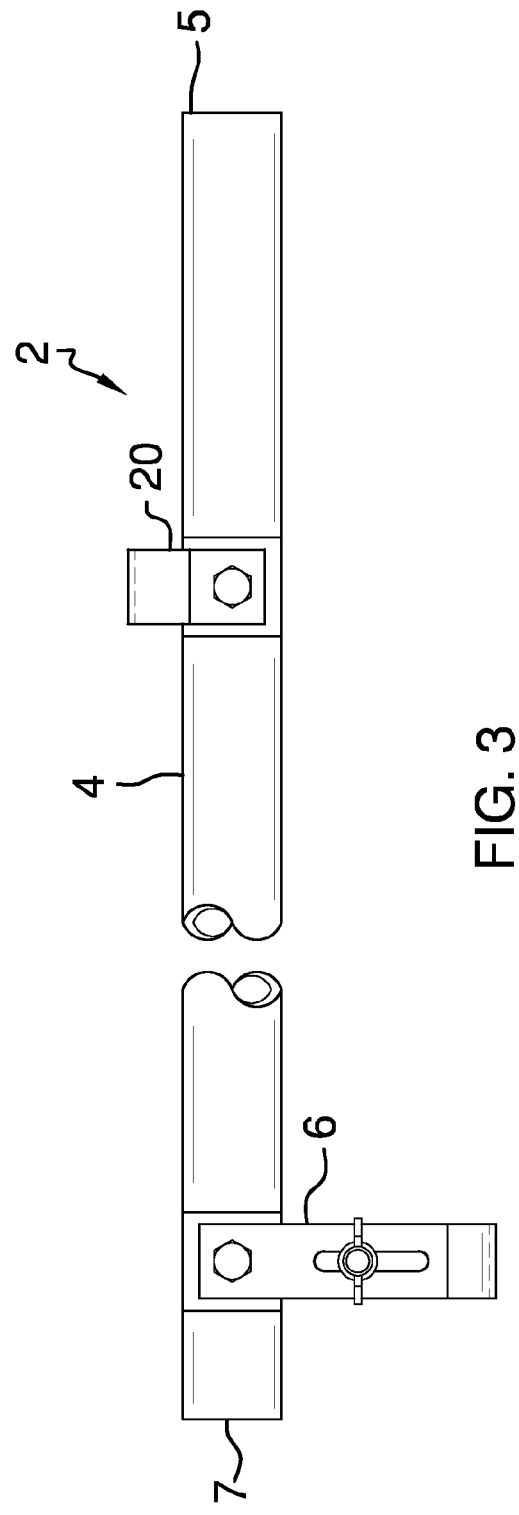

FISHING POLE MOUNT

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of fishing pole mounts are known in the prior art. However, what is needed is a fishing pole mount that allows an individual to easily attach the mount to a fixed or weighted object that provides a strong enough structural framework to support a fishing pole inserted into the fishing pole mount.

FIELD OF THE INVENTION

The present invention relates to a fishing pole mount, and more particularly, to a fishing pole mount that provides features and characteristics above and beyond existing fishing pole mounts on which individuals can utilize.

SUMMARY OF THE INVENTION

The general purpose of the present fishing pole mount, described subsequently in greater detail, is to provide a fishing pole mount which has many novel features that result in a fishing pole mount which is not anticipated, rendered obvious, suggested, or even implied by prior art, either alone or in combination thereof.

To accomplish this, the present fishing pole mount comprises a support tube that has an adjustable support brace attached to it. The fishing pole mount also has an upper clamp that is not adjustable. The support tube of the fishing pole mount can be fixedly attached to a camp chair or other fixed object while a handle of a fishing pole can be inserted into the support tube.

Thus has been broadly outlined the more important features of the present fishing pole mount so that the detailed description thereof that follows may be better understood and in order that the present contribution to the art may be better appreciated.

BRIEF DESCRIPTION OF THE DRAWINGS

FIG. 2 is a top view of the fishing pole mount.
FIG. 3 is a side view of the fishing pole mount.

DETAILED DESCRIPTION OF THE DRAWINGS

Figure 1:
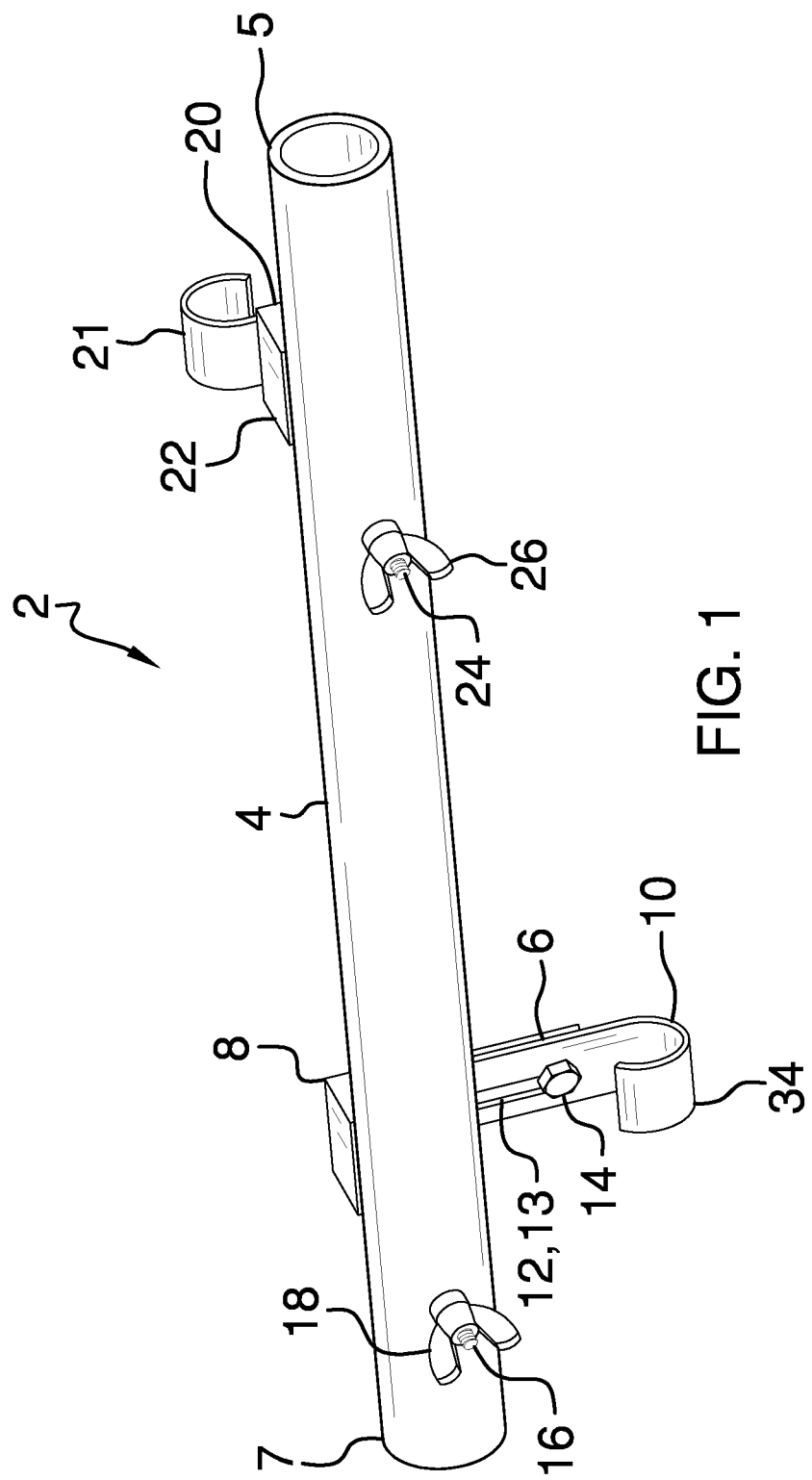
FIG. 1 is an isometric view of the fishing pole mount.
Figure 5:
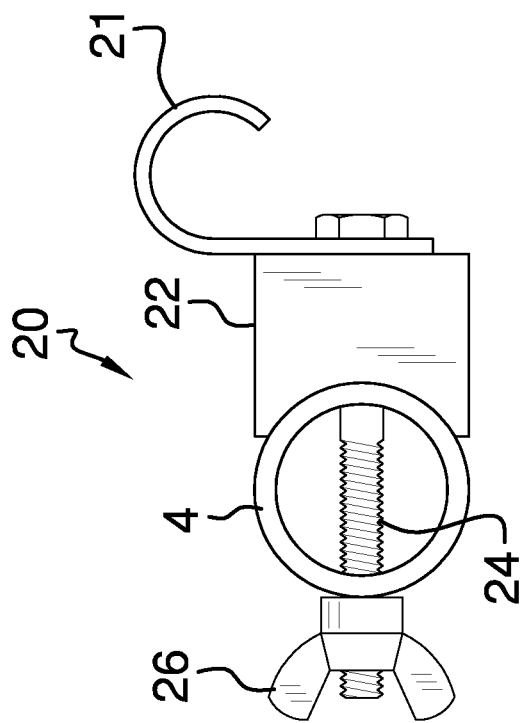
FIG. 5 is a right end view of the fishing pole mount.
Figure 4:
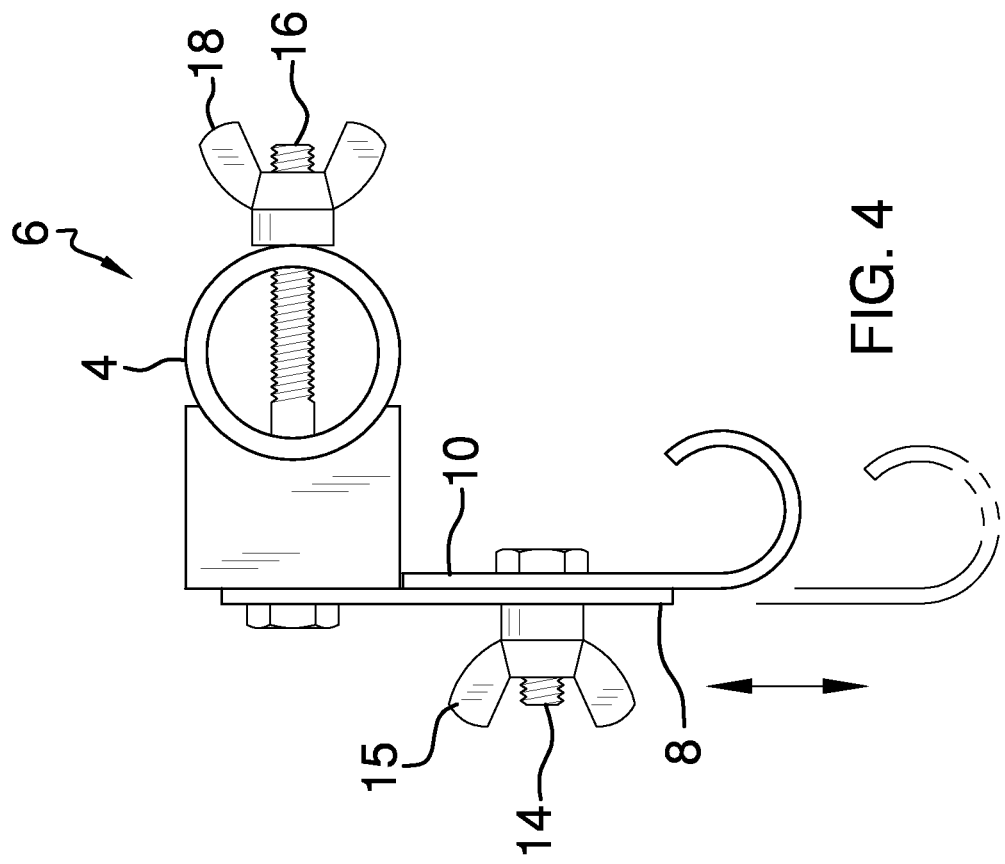
FIG. 4 is a left end view of the fishing pole mount.
Figure 6:
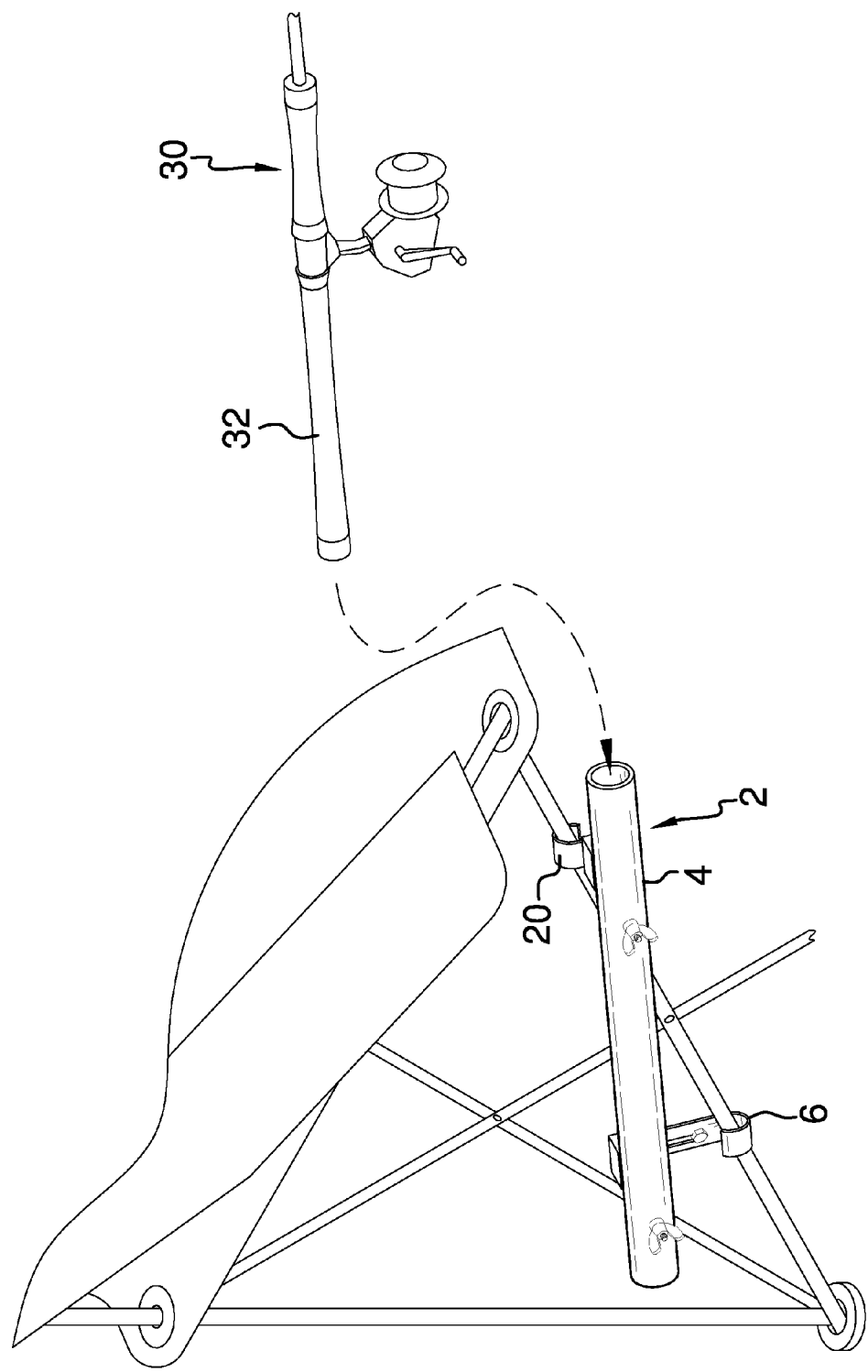
FIG. 6 is a representational view of the fishing pole mount as it would appear in use.

With reference now to the drawings, and in particular FIGS. 1 through 6 thereof, an example of the instant fishing pole mount employing the principles and concepts of the present fishing pole mount and generally designated by the reference number 2 will be described.

Referring to FIGS. 1 through 6, a preferred embodiment of the present fishing pole mount 2 is illustrated. The fishing pole mount 2 includes a support tube 4 that has two ends comprising a first end 5 and a second end 7. The first end 5 of the support tube 4 is open.

The support tube 4 has an attached support brace 6 near the second end 7 of the support tube 4. The support brace 6 is fabricated from a fixed portion 8 that is attached to the support tube 4 and an adjustable portion 10 that is adjustably attached to the fixed portion 8.

The fixed portion 8 of the support brace 6 is attached to the support tube by use of a mount screw 16 and a wing nut 18 that is threadably attached to the mount screw 16. The mount screw 16 mates the fixed portion 8 to the support tube 4 and then travels completely through the support tube 4, at which point, the wing nut 18 is threadably attached.

The adjustable portion 10 of the support brace 6 is attached to the fixed portion 8 of the support brace 6 by insertion of a set screw 14 through a track 12 located in on the adjustable portion 10 and a track 13 located on the fixed portion 8. Then, a wing nut 15 is threadably attached to the set screw 14 until a tight fit is achieved. The adjustable portion 10 of the support brace 6 has an end-mounted loop 34 to attach to an object as needed.

The support tube 4 also has an upper clamp 20 that is located close to the first end 5 of the support tube 4. Upper clamp 20 is connected to a mount 22, which in turn is fixedly attached to the support tube 4 by inserting a set screw 24 through mount 22 and support tube 4 and then threadably attaching a wing nut 26 to it. Upper clamp 20 also has an end-mounted loop 21 on it to attach to an object as needed.

In use, the support tub 4 of the fishing pole mount 2 is preferably attached to a fixed object, such as a camp chair 28. Both of the end-mounted loops 21, 34 would be affixed to the chair 28. The handle 32 of a fishing pole 30 is then inserted into the first end 5 of the support tube 4. Using the fishing pole mount 2 in this manner can either be used to temporarily shelve a particular fishing pole 30 or can also be used in lieu of holding the fishing pole 30 while fishing.

What is claimed is:

1. A fishing pole mount comprising:
   a support tube, the support tube having two ends comprising a first end and a second end;
   a support brace attached to the support tube near the second end of the support tube, wherein the support brace includes an end-mounted loop;
   wherein the support tube is attached to a fixed object;
   further wherein the handle of a fishing pole can be inserted into the first end of the support tube;
   wherein the support brace further comprises:
      a fixed portion attached to the support brace, the fixed portion including a track;
      an adjustable portion adjustably attached to the fixed portion, the adjustable portion including a track;
   wherein the fishing pole mount further comprises:
      a mount screw, wherein the mount screw mates with the fixed portion of the
      support brace to the support tube, further wherein the mount screw travels completely through the support tube;
      a first wing nut, wherein the first wing nut is threadably attached to the mount screw;
      a first set screw, wherein the first set screw is placed through the track located on the adjustable portion of the support brace, further wherein the first set screw is placed through the track located on the fixed portion of the support brace;

a second wing nut, wherein the second wing nut is threadably attached to the first set screw until a tight fit is achieved;

a second set screw;

a mount; wherein the mount is fixedly attached to the support tube by inserting the second set screw through the mount and through the support tube;

a third wing nut, wherein the third wing nut is threadably attached to the second set screw; and an upper clamp attached to the mount, wherein the upper clamp includes an end-mounted loop.

2. A fishing pole mount according to claim 1 wherein the fixed object to which the fishing pole mount is attached further comprises a chair.

3. A fishing pole mount comprising:

a support tube, the support tube having two ends comprising a first end and a second end;

a support brace attached to the support tube near the second end of the support tube, wherein the support brace includes an end-mounted loop; wherein the support brace further comprises:

a fixed portion attached to the support brace, the fixed portion including a track; and an adjustable portion adjustably attached to the fixed portion, the adjustable portion including a track;

a mount screw, wherein the mount screw mates with the fixed portion of the support brace to the support tube, further wherein the mount screw travels completely through the support tube;

a first wing nut, wherein the first wing nut is threadably attached to the mount screw;

a first set screw, wherein the first set screw is placed through the track located on the adjustable portion of the support brace, further wherein the first set screw is placed through the track located on the fixed portion of the support brace;

a second wing nut, wherein the second wing nut is threadably attached to the first set screw until a tight fit is achieved;

a second set screw;

a mount; wherein the mount is fixedly attached to the support tube by inserting the second set screw through the mount and through the support tube;

a third wing nut, wherein the third wing nut is threadably attached to the second set screw;

an upper clamp attached to the mount, wherein the upper clamp includes an end-mounted loop;

wherein the support tube is attached to a fixed object, wherein the fixed object is preferably a chair;

further wherein the handle of a fishing pole can be inserted into the first end of the support tube.

\* \* \* \* \*